(12) United States Patent
Yokota

(10) Patent No.: US 6,660,824 B2
(45) Date of Patent: Dec. 9, 2003

(54) GOLF BALL

(75) Inventor: Masatoshi Yokota, Kobe (JP)

(73) Assignee: Sumitomo Rubber Industries Limited, Hyogo (JP)

( * ) Notice: Subject to any disclaimer, the term of this patent is extended or adjusted under 35 U.S.C. 154(b) by 0 days.

(21) Appl. No.: 10/090,644

(22) Filed: Mar. 6, 2002

(65) Prior Publication Data

US 2003/0032503 A1 Feb. 13, 2003

(30) Foreign Application Priority Data

Mar. 13, 2001 (JP) ........................................ 2001-070902

(51) Int. Cl.$^7$ ................................................. C08G 18/10
(52) U.S. Cl. ........................................ 528/61; 473/378
(58) Field of Search ............................. 528/61; 473/378

(56) References Cited

U.S. PATENT DOCUMENTS

| | | | |
|---|---|---|---|
| 3,130,102 A | | 4/1964 | Watson et al. |
| 3,989,568 A | | 11/1976 | Isaac |
| 5,013,813 A | * | 5/1991 | Zimmermann et al. |
| 5,334,673 A | | 8/1994 | Wu |
| 6,309,313 B1 | * | 10/2001 | Peter |

* cited by examiner

*Primary Examiner*—Rachel Gorr
(74) *Attorney, Agent, or Firm*—Birch, Stewart, Kolasch & Birch, LLP

(57) ABSTRACT

The invention provides an improved golf ball which exhibits satisfactory ball characteristics, particularly, repulsion property and scuff resistance. The golf ball has a cover made of the polyurethane prepared by curing a urethane prepolymer having an isocyanate group at a terminal thereof with an amine-type curing agent represented by the following general formula:

$$H_2N—R^1\text{-polyether moiety-}R^2—NH_2$$

where $R^1$ and $R^2$ are independently hydrocarbon groups each having 1 to 6 carbon atoms. The amine-type curing agent causes curing at such a speed as to ensure a pot life allowing necessary operations to be performed.

17 Claims, No Drawings

GOLF BALL

BACKGROUND OF THE INVENTION

1. Field of the Invention

The present invention relates to a golf ball covered with a thermosetting polyurethane cover that is excellent in scuff resistance and repulsion property.

2. Description of the Related Art

Ionomer resin covers are mainly used for covers covering golf ball cores because they have superior durability. Golf balls with ionomer resin covers, however, give golfers a larger impact upon a shot than golf balls with Balata covers and hence are likely to impart the golfers with an inferior shot feeling.

In recent years, polyurethane is receiving attention as an inexpensive cover material that has higher durability than Balata covers while imparting golfers with a shot feeling analogous to that imparted by Balata covers. For example, Japanese Patent No. 2662909 discloses a thermosetting polyurethane cover, and Japanese Patent Laid-Open Gazette No. HEI 9-215778 proposes a thermoplastic polyurethane cover.

The art of Japanese Patent No. 2662909 is capable of suppressing a steep increase in viscosity due to the reaction rapidly proceeding between a urethane prepolymer and a polyamine curing agent thereby to enable the molding of a cover by the use of a slow-reactive polyamine curing agent such as 3,5-dimethylthio-2,4-toluenediamine, 3,5-dimethylthio-2,6-toluenediamine, N,N'-dialkyldiaminodiphenylmethane, trimethylene glycol-di-p-aminobenzoate or polytetramethyleneoxide-di-p-aminobenzoate, or a mixture thereof. However, a golf ball with a resulting cover is not satisfactory in terms of repulsion property, spin performance and scuff resistance as compared with golf balls with ionomer resin covers. Thus, further improvements are desired.

Thermoplastic polyurethane elastomer covers are superior in moldability to thermosetting polyurethane covers, but are inferior in wear resistance, tear strength and scuff resistance to thermosetting polyurethane covers because of the lack of crosslinking points.

SUMMARY OF THE INVENTION

An object of the present invention is to provide a golf ball with a thermosetting polyurethane cover that is satisfactory in ball characteristics, particularly, repulsion property and scuff resistance.

A golf ball of the present invention comprises a core and a polyurethane cover covering the core. The polyurethane cover is formed from a cured product prepared by curing a urethane prepolymer having an isocyanate group at a terminal thereof with an amine-type curing agent represented by the following general formula:

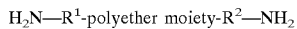
$H_2N$—$R^1$-polyether moiety-$R^2$—$NH_2$ where $R^1$ and $R^2$ are independently hydrocarbon groups each having 1 to 6 carbon atoms.

The foregoing and other objects, features and attendant advantages of the present invention will become apparent from the reading of the following detailed description.

DETAILED DESCRIPTION OF THE PREFERRED EMBODIMENTS

The present invention will now be described in detail.

The golf ball of the present invention is characterized that a core comprising a single- or multi-layered vulcanized rubber body or a wound core is covered with a specific polyurethane cover.

The polyurethane cover is formed from a cured product prepared by curing a urethane prepolymer having an isocyanate group as the terminal group thereof (hereinafter referred to as "isocyanate group-terminated urethane prepolymer") with an amine-type curing agent represented by the following general formula:

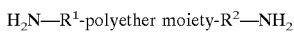
$H_2N$—$R^1$-polyether moiety-$R^2$—$NH_2$

In the formula, $R^1$ and $R^2$ are each an intervening group interconnecting the polyether moiety and an amino group. The intervening group is a hydrocarbon chain having 1 to 6 carbon atoms, preferably a linear alkylene group such as ethylene, trimethylene, tetramethylene, pentamethylene or hexamethylene, or a branched alkylene group such as propylene, ethylethylene, butylethylene or dietyletylene.

In the formula of the amine-type curing agent, the polyether moiety is an alkylene oxide group of a linear alkylene glycol such as ethylene glycol, diethylene glycol, polyethylene glycol, methylene glycol, trimethylene glycol or polytetramethylene ether glycol, or a branched alkylene glycol such as propylene glycol, polypropylene glycol, butylene glycol, sec-butyl glycol, hexylene glycol or neopentyl glycol; or a polyether obtained by polymerization of these alkylene glycols. Among such polyether moieties, a polyether moiety represented by the following formula is preferable:

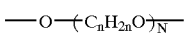
$$—O—(C_nH_{2n}O)_{\overline{N}}—$$

In the above formula, "n", namely the number of carbon atoms, indicates an integer of 2 to 6 and "N", namely the number of repeating unit represented by the bracket, indicates an integer of 1 to 40. Specific examples of the preferable alkylene oxide unit include a linear alkylene oxide such as ethylene oxide, trimethylene oxide, tetramethylene oxide, pentamethylene oxide or hexamethylene oxide, or a branched alkylene oxide such as propylene oxide, ethylethylene oxide, butylethylene oxide or diethylethylene oxide. The amine-type curing agent having a polyether moiety represented by the above formula ensures a curing time enough to improve moldability and workability of the cover composition and provide for a cured product having desired physical properties.

Since such an amine-type curing agent does not have any bulky group, polyurethane resulting from the curing reaction using the curing agent is easy to orientation-crystallize and provides a polyurethane cover having high hardness and superior scuff resistance. Though neither any bulky group nor any electron-attractive group acting to lower the reactivity of amino groups exists in a molecule of the curing agent, the amino groups are spaced apart from each other by the polyether moiety and the intervening groups and, hence, the curing agent causes curing at such a speed as to ensure a pot life allowing necessary operations to be performed. Further, the polyether moiety, which can act as a soft segment of the resulting polyurethane, makes it possible to impart the resulting polyurethane with a moderate tensile elongation. Thus, the polyurethane cover is capable of following ball deformation occurring upon a shot, thereby ensuring a golf ball that is less susceptible to break by shots and is excellent in durability.

The amine-type curing agent represented by the formula noted above preferably has a number-average molecular weight of not less than 200. If the number-average molecular weight of the curing agent is less than 200, the curing agent causes the curing reaction to proceed too rapidly due to the absence of any bulky group acting to interfere with the curing reaction or any electron-attractive group acting to lower the reactivity of the amino groups in a molecule of the curing agent. Stated otherwise, the pot life becomes so short that the workability and moldability of the cover composition lower. Further, the urethane bond resulting from the reaction between the curing agent and the NCO group of the urethane prepolymer acts as a hard segment and, hence, if the polyether moiety becomes too small, the resulting polyurethane is rendered hard and is poor in stretchability. Thus, a cover formed from such polyurethane is incapable of following ball deformation occurring upon a shot, resulting in a golf ball that is easy to break by shots and hence cannot ensure desired durability. The upper limit of the number-average molecular weight of the curing agent is preferably 3000, more preferably 2000. If the number-average molecular weight of the curing agent is more than 3000, the resulting polyurethane is too soft to ensure desired repulsion property due to the soft segment of the polyether moiety becoming too large.

Examples of such amine-type curing agents include 4,7,10-trioxytridecane-1,13-diamine, 4,7,10,13-tetraoxyhexadecane-1,16-diamine, 4,9-dioxadodecane-1,12-diamine, 4,9,14-trioxyheptadecane-1,17-diamine, and POLYETHER AMINE D2000 (number-average molecular weight: 2000), POLYETHER AMINE D400 (number-average molecular weight: 400) and POLYETHER AMINE D230 (number-average molecular weight: 230) produced by BASF JAPAN Co.

The isocyanate group-terminated urethane prepolymer used in the present invention is a urethane prepolymer obtained by the reaction between any one of the following polyisocyanates and any one of the following polyols.

Examples of specific polyisocyanates for use as raw materials of isocyanate group-terminated urethane prepolymers include aromatic diisocyanates such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI) and paraphenylene diisocyanate (PPDI); alicyclic or aliphatic diisocyanates such as 4,4'-dicyclohexylmethane diisocyanate (hydrogenated MDI), hexamethylene diisocyanate (HDI) and isophorone diisocyanate (IPDI); and carbodiimide-modified diphenylmethane diisocyanate (liquefied MDI); or a mixture including at least two of them. Among them, TDI or hydrogenated MDI is preferably used because the resulting polyurethane cover has favorable mechanical properties and a golf ball with the resulting polyurethane cover is satisfactory in repulsion property, weatherability and water resistance.

Any polyol having a plurality of hydroxyl groups may be used as a raw material of the isocyanate group-terminated urethane prepolymer regardless of whether it is a low-molecular-weight compound or a high-molecular-weight compound. Examples of such low-molecular-weight polyols include diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol. Examples of such high-molecular-weight polyols include polyether polyols obtained by the reaction between an initiator having active hydrogen and alkylene oxide; condensed polyester polyols obtained by the dehydro-condensation between a dibasic acid, such as adipic acid, and a glycol or a triol; lactone polyester polyols obtained by the ring opening polymerization of a lactam such as ε-caprolactam; polycarbonate diols generally synthesized using a cyclic diol; and polymer polyols such as an acrylic polyol prepared by introducing an appropriate hydroxyl group into an acrylic copolymer. Examples of specific polyether polyols include polyethylene glycol, polypropylene glycol (PPG), and poly (tetramethylene ether) glycol (PTMG). Examples of specific condensed polyester polyols include polyethylene adipate (PEA), polybutylene adipate (PBA), and polyhexamethylene adipate (PHMA). Examples of specific lactone polyester polyols include poly-ε-caprolactone (PCL). In view of their superior repulsion property and water resistance, polyether polyols are preferable. Among the polyols mentioned above, poly(tetramethylene ether) glycol (PTMG) is preferably used.

The isocyanate group-terminated urethane prepolymer is obtained by a reaction between the aforementioned polyisocyanate and the aforementioned polyol. The polyisocyanate and the polyol are allowed to react with each other so that the resulting isocyanate group-terminated urethane prepolymer contains free NCO groups inclusive of terminal isocyanate groups in an amount of preferably 3% to 20% by mass, more preferably 5% to 15% by mass. If the free NCO group content is less than 3% by mass, the resulting polyurethane has a low density of crosslinking points forming a network structure and, hence, a cover formed from such polyurethane is so soft that the cover has lowered durability. If it is more than 20% by mass, on the other hand, the resulting polyurethane has too high a crosslinking density and, hence, a cover formed from such polyurethane is so hard that a golf ball with such a cover imparts a poor shot feeling to golfers.

The polyurethane cover of the golf ball according to the present invention is obtained by curing the aforementioned isocyanate group-terminated urethane prepolymer with the amine-type curing agent having the aforementioned polyether moiety (hereinafter referred to as "polyether amine curing agent" as the case may be). In addition to the polyether amine curing agent, it is possible to use an amine-type curing agent other than the polyether amine curing agent or a diol-type curing agent in an amount of not more than 30% by mass relative to the total amount of curing agents used. In view of the moldability and workability of the cover composition and the physical properties of the resulting polyurethane it is preferred that the curing agent used in the present invention be composed substantially of the polyether amine curing agent.

Though the ratio of the curing agent to the isocyanate group-terminated urethane prepolymer to be blended is not particularly limited, it is preferred that the curing agent and the isocyanate group-terminated urethane prepolymer be blended together so that the equivalent ratio of the total amount of amino groups and OH groups contained in the curing agent to the amount of NCO groups contained in the isocyanate group-terminated urethane prepolymer, i.e., $(OH+NH_2)/NCO$ assumes 0.80 to 1.2. According to the more preferable invention, polyether amine curing agent is substantially used as a curing agent and the equivalent ratio of amino groups of the curing agent to NCO groups of the isocyanate group-terminated urethane prepolymer, i.e. $NH_2/NCO$ ranges from 0.80 to 1.2.

The molding material for the polyurethane cover according to the present invention may contain any conventionally known catalyst for use in a urethane reaction in addition to the aforementioned isocyanate group-terminated urethane prepolymer and the curing agent. Examples of such catalysts include monoamines such as triethylamine and N,N-dimethylcyclohexylamine; polyamines such as N,N,N',N'-tetramethylethylenediamine and N,N,N',N'',N''-pentamethyldiethylenetriamine; cyclic diamines such as 1,8-diazabicyclo[5,4,0]-7-undecene (DBU) and triethylenediamine; and tin catalysts such as dibutyltin dilaurylate and dibutyltin diacetate. As required, the molding material may contain a filler such as barium sulfate, a coloring agent such as titanium dioxide, and other additives such as a dispersant, antioxidant, ultraviolet absorber, light stabilizer, fluorescent material, and fluorescent brightener unless they impair any desired property to be imparted to an intended golf ball by the resulting cover.

The curing reaction of the polyurethane needs to be caused in a state where the isocyanate group-terminated urethane prepolymer and the curing agent are homogeneously mixed together. The amine-type curing agent is liquid at normal temperature, while the isocyanate group-terminated urethane prepolymer is a solid or wax state at room temperature. For this reason it is preferable that the isocyanate group-terminated urethane prepolymer is first heated until it becomes a molten state and then admixed with the amine-type curing agent. Thereafter, it is sufficient to inject the resulting mixture into a mold heated to a temperature close to the mixing temperature. Generally such a mixture can be cured at 60° C. to 120° C. taking about 10 to 120 minutes though depending on the type of each of the curing agent and the isocyanate group-terminated urethane prepolymer. Curing of the mixture under such conditions ensures satisfactory productivity and workability with less influence on a vulcanized rubber core or the rubber thread of a wound core during the molding of the cover.

There is no particular limitation on the core used in the golf ball of the present invention. It is possible to use any solid core conventionally used in a multi-piece solid golf ball or any conventional wound core.

The solid core is a molded vulcanizate of a core rubber composition typically comprising a diene rubber such as butadiene rubber, an organic peroxide, and unsaturated carboxylic acid or a metal salt thereof and may be either a single-layered core or a multi-piece core having plural layers. The wound core is a core comprising a rubber sphere and rubber thread wound about the rubber sphere.

The core has a diameter of 36.8 to 41.8 mm, preferably 37.8 to 41.4 mm. The thickness of the cover is 0.5 to 3.0 mm, preferably 0.7 to 2.5 mm. If the cover is too thin, a golf ball with the cover exhibits lowered durability, while if it is too thick, a golf ball with the cover exhibits lowered repulsion property.

The golf ball of the present invention is manufactured by covering the aforementioned core with the aforementioned polyurethane cover. The cover may be single-layered or multi-layered. In the case of a multi-layered cover, it is required that at least one layer thereof consist of the polyurethane cover according to the present invention. Further, the golf ball of the present invention is usually provided with paint finish, a marking stamp and the like to enhance the appearance and commercial value thereof before it is put on the market.

EXAMPLES

Hereinafter, the present invention will be more specifically described by way of examples, which are, in no way, construed as limitative of the present invention.
Measurement and Evaluation Methods
1. Hardness of Golf Ball The hardness of a non-dimpled portion of each golf ball was measured using a JIS-A hardness tester.
2. Repulsion Index An aluminum cylindrical body having a weight of 198.4 g was allowed to impinge upon each golf ball at a velocity of 45 m/sec. The respective velocities of the cylindrical body and the golf ball before and after the impingement were measured, and the repulsion coefficient of the golf ball was calculated from the respective velocities thus measured and the respective weights of the cylindrical body and golf ball. The measurement was performed five times for each golf ball and the average of the measured values was calculated.

The repulsion coefficient of each golf ball was reduced to an index number assuming that the repulsion coefficient of a golf ball having a conventional polyurethane cover (No. 5) was 100. A greater index is indicative of a higher repulsion property.
3. Scuff Resistance Two portions of each golf ball were each hit once using a commercially available pitching wedge attached to a swing robot at a head speed of 36 m/sec. The condition of each of the two portions thus hit was visually observed and rated into five ranks according to the following criteria. The lower rating was regarded as the rating of the golf ball.
Five points: a ball condition with substantially no flaw;
Four points: a ball condition with no noticeable flaw when visually observed but with slight flaws when the ball picked up by hand was closely observed;
Three points: a ball condition with noticeable flaws when visually observed;
Two points: a ball condition with conspicuous flaws;
One point: a ball condition with flaws to such an extent as not to enable the golf ball to be used any more.
Manufacture of Golf Ball
(1) Manufacture of Solid Core The rubber composition of the formulation shown in Table 1 was subjected to vulcanizing molding at 160° C. for 30 minutes, to form a spherical solid core having a diameter of 40.0 mm.

In Table 1, butadiene rubber is high-cis polybutadiene (cis content: 96%) produced by JSR Corp.; zinc acrylate is "ZNDA 90S" produced by Nippon Jyoryu Co.; zinc white is "Zinc white NO. 1" produced by Toho zinc.; and dicumyl peroxide is one produced by NOF Corp.

TABLE 1

| Compound | Amount (parts by mass) |
| --- | --- |
| Butadiene rubber | 100 |
| Zinc acrylate | 30 |
| Zinc white | 5 |
| Dicumyl peroxide | 0.5 |

(2) Synthesis of Prepolymer

Polytetramethylene ether glycol (produced by BASF JAPAN Co., number-average molecular weight: 1962) and 4,4'-diphenylmethane diisocyanate (Nippon Polyurethane Industry Co.) were mixed together so that the equivalent ratio of NCO group relative to OH group (NCO/OH) assumed 4/1. The resulting mixture was reacted at 70° C. for three hours in a nitrogen atmosphere while being stirred, to synthesize an isocyanate group-terminated urethane prepolymer having an NCO content of 8.1% by mass and a number-average molecular weight of 3090.
(3) Manufacture of Cover The urethane prepolymer thus prepared was mixed with each curing agent shown in Table 2 so that the ratio of the isocyanate group of the urethane prepolymer to the amino group of the curing agent (NH$_2$/NCO) assumed 1.05. Further, TITANIUM OXIDE A100 produced by Ishihara Sangyo was added in an amount of 2 parts by mass to 100 parts by mass of the total amount of the urethane prepolymer and the curing agent, to give a cover composition in a viscous liquid state.

The cover composition thus prepared was injected into a hemispherical mold formed with convex portions for forming dimples in which the previously manufactured core was held, and then this mold was inverted and mated with another hemispherical mold (also formed with convex portions for forming dimples) containing the cover composition injected thereinto, followed by press molding for the composition to cure under the curing conditions (mold temperature×curing time) shown in Table 2.

After the curing, the resulting golf ball was removed from the molds, deburred, and then coated with a white paint and further with a clear paint. In this way, there were obtained golf balls Nos. 1 to 5 each having a diameter of 24.8 mm and a mass of 45.2 to 45.7 g.

It should be noted that 4,7,10-trioxytridecane-1,13-diamine, POLYETHER AMINE D400 and POLYETHER AMINE D2000 in Table 2, respectively, are polyether amines produced by BASF JAPAN Co. POLYETHER AMINE D400 is a compound comprising an ether moiety consisting of polypropylene glycol of which the number of repeating unit (N) is about 5, intervening groups consisting of isopropylene on opposite sides of the polyether moiety, and amino groups bonded to respective intervening groups. POLYETHER AMINE D2000 is a compound comprising an ether moiety consisting of polypropylene glycol of which the number of repeats (N) is about 30, intervening groups consisting of isopropylene on opposite sides of the ether moiety, and amino groups bonded to respective intervening groups. Ethacure 300 is a product of Albemare Asano Co. that is a mixture of 3,5-dimethylthio-2,4-toluenediamine and 3,5-dimethylthio-2,6-toluenediamine. Elasmer 250P is polytetramethyleneoxide aminobenzoate (amine value: 249.4 mg KOH/g) produced by Ihara chemical Ind.

According to the measurement and evaluation methods described above, each golf ball was evaluated as to its hardness, repulsion property and scuff resistance. The results obtained are shown in Table 2.

Ethacure 300 used in golf ball No. 4 had a molecular weight nearly equal to the curing agent used in golf ball No. 1 and required substantially the same curing condition as required by the curing agent used in golf ball No. 1. However, golf ball No. 4 using Ethacure 300 exhibited poor stretchability, lower repulsion property in spite of its relatively high hardness, and unsatisfactory scuff resistance because Ethacure 300 had no soft segment. Elasmer 250P required higher temperature and longer time for curing though it had not so large a molecular weight. Presumably this is because the electron-attractive group (benzyl group) present in the molecular structure of the curing agent lowered the reactivity of amine and hence contributed to retardation in the curing reaction. Golf ball No. 5 using Elasmer 250P exhibited low hardness and inferior repulsion property and scuff resistance as compared with golf ball No. 2 using a curing agent having a molecular weight nearly equal to Elasmer 250P. Presumably this is because Elasmer 250P having a relatively long polyether moiety caused the proportion of soft segment to increase.

The golf ball of the present invention, which has a thermosetting polyurethane cover formed by the use of a specific curing agent, ensures satisfactory moldability and workability and is excellent in repulsion property and scuff resistance.

This application is based on Japanese Application Serial No. 2001-70902 filed in Japan Patent Office on Mar. 13, 2001, the contents of which are hereby incorporated by reference.

While only certain presently preferred embodiments of the present invention have been described in detail, as will be apparent for those skilled in the art, certain changes and modifications may be made in embodiment without departing from the spirit and scope of the present invention as defined by the following claims.

What is claimed is:

1. A golf ball comprising a core, and a polyurethane cover covering the core, wherein the polyurethane cover is formed from a cured product prepared by curing a urethane prepolymer having an isocyanate group at a terminal thereof with an amine-type curing agent represented by the following general formula:

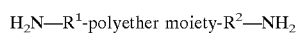

$$H_2N\text{—}R^1\text{-polyether moiety-}R^2\text{—}NH_2$$

TABLE 2

| Ball No. | | 1 | 2 | 3 | 4 | 5 |
|---|---|---|---|---|---|---|
| Curing agent | Type | 4,7,10-trioxytridecane-1,13-diamine | Polyether amine D-400 | Polyether amine D-2000 | Ethacure 300 | Elasmer 250P |
| | Molecular weight | 220 | 400 | 2000 | 214 | 488 |
| Curing conditions | Temperature (° C.) × Time (min) | 70 × 10 | 70 × 10 | 80 × 15 | 70 × 15 | 120 × 30 |
| Characteristics | Hardness | 56 | 54 | 50 | 54 | 52 |
| | Repulsion index | 105 | 103 | 102 | 101 | 100 |
| | Scuff resistance | 5 | 5 | 4 | 3 | 3 |

As can be understood from balls Nos. 1 to 3, as the molecular weight of the curing agent increases, the soft segment of polyurethane grows larger, resulting in the cover becoming softer and, hence, the repulsion property and scuff resistance of the ball tend to lower. Particularly, with a cover formed using a curing agent having a molecular weight of 2000 or more that has a higher melting temperature for causing the curing reaction, the cover becomes susceptible to flaws.

where $R^1$ and $R^2$ are independently hydrocarbon groups each having 1 to 6 carbon atoms.

2. The golf ball according to claim 1, wherein the amine-type curing agent has a number-average molecular weight of from 200 to 3000.

3. The golf ball according to claim 1, wherein:

the urethane prepolymer has a free NCO group content of from 3% to 20% by mass; and the equivalent ratio of the amino group of the curing agent to the NCO group of the prepolymer ranges from 0.8 to 1.2.

4. The golf ball according to claim 1, wherein the polyether moiety of the amine-type curing agent is represented by the following formula:

where n is an integer from 2 to 6, and N is an integer from 1 to 40.

5. The golf ball according to claim 1, wherein the polyether moiety of the amine-type curing agent is an alkylene oxide group of a linear alkylene glycol.

6. The golf ball according to claim 5, wherein the linear alkylene glycol is selected from the group consisting of ethylene glycol, diethylene glycol, polyethylene glycol, methylene glycol, trimethylene glycol, and polytetramethylene glycol.

7. The golf ball according to claim 1, wherein the polyether moiety of the amine-type curing agent is an alkylene oxide group of a branched alkylene glycol.

8. The golf ball according to claim 7, wherein the branched alkylene glycol is selected from the group consisting of propylene glycol, polypropylene glycol, butylene glycol, sec-butyl glycol, hexylene glycol, and neopentyl glycol.

9. The golf ball according to claim 1, wherein the urethane prepolymer has a poly(tetramethylene ether) glycol as a polyol component.

10. A golf ball comprising a core, and a polyurethane cover covering the core, wherein
the polyurethane cover is formed from a cured product prepared by curing a urethane prepolymer having an isocyanate group at a terminal thereof with an amine-type curing agent represented by the following formula:

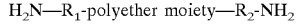

where $R_1$ and $R_2$ are independently hydrocarbon groups each having 1 to 6 carbon atoms and the polyether moiety is an alkylene oxide group of a linear alkylene glycol selected from the group consisting of ethylene glycol, diethylene glycol, polyethylene glycol, methylene glycol, trimethylene glycol, and polytetramethylene ether glycol.

11. The golf ball according to claim 10, wherein the amine-type curing agent has a number average molecular weight of from 200 to 3000.

12. The golf ball according to claim 11, wherein the urethane prepolymer has a poly(tetramethylene ether) glycol as a polyol component.

13. The golf ball according to claim 12, wherein the urethane prepolymer has a free NCO group content of from 3% to 20% by mass, and the equivalent ratio of the amino group of the curing agent to the NCO group of the prepolymer ranges from 0.8 to 1.2.

14. A golf ball comprising a core, and a polyurethane cover covering the core, wherein
the polyurethane cover is formed from a cured product prepared by curing a urethane prepolymer having an isocyanate group at a terminal thereof with an amine-type curing agent represented by the following formula:

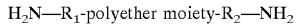

where $R_1$ and $R_2$ are independently hydrocarbon groups each having 1 to 6 carbon atoms and the polyether moiety is an alkylene oxide group of a branched alkylene glycol selected from the group consisting of propylene glycol, polypropylene glycol, butylene glycol, sec-butyl glycol, hexylene glycol, and neopentyl glycol.

15. The golf ball according to claim 14, wherein the amine-type curing agent has a number-average molecular weight of from 200 to 3000.

16. The golf ball according to claim 15, wherein the urethane prepolymer has a poly(tetramethylene ether) glycol as a polyol component.

17. The golf ball according to claim 16, wherein the urethane prepolymer has a free NCO group content of from 3% to 20% by mass, and the equivalent ratio of the amino group of the curing agent to the NCO group of the prepolymer ranges from 0.8 to 1.2.

* * * * *